US010822072B2

(12) United States Patent
Schlipf et al.

(10) Patent No.: US 10,822,072 B2
(45) Date of Patent: Nov. 3, 2020

(54) WING FOR AN AIRCRAFT

(71) Applicant: Airbus Operations GmbH, Hamburg (DE)

(72) Inventors: Bernhard Schlipf, Hamburg (DE); Dort Daandels, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 231 days.

(21) Appl. No.: 15/928,601

(22) Filed: Mar. 22, 2018

(65) Prior Publication Data

US 2018/0281927 A1    Oct. 4, 2018

(30) Foreign Application Priority Data

Mar. 24, 2017   (DE) .................... 10 2017 106 443

(51) Int. Cl.
*B64C 9/24* (2006.01)
*B64C 13/34* (2006.01)
*B64C 9/22* (2006.01)

(52) U.S. Cl.
CPC .................. *B64C 9/24* (2013.01); *B64C 9/22* (2013.01); *B64C 13/34* (2013.01)

(58) Field of Classification Search
CPC ......... B64C 13/34; B64C 13/28; B64C 13/22; B64C 3/38; B64C 9/14; B64C 9/26
(Continued)

(56) References Cited

U.S. PATENT DOCUMENTS 4,399,970 A    8/1983  Evans
4,437,631 A *  3/1984  Martens ................. B64C 9/24
                                                244/210
(Continued)

FOREIGN PATENT DOCUMENTS

DE           3321128 A1    12/1984
DE    102014201239 A1 *    7/2015    ............. B64C 13/24
(Continued)

OTHER PUBLICATIONS

German Search Report for German Application No. 102017106443 dated Mar. 24, 2017.
German Search Report for German Application No. 102017106445 dated Mar. 24, 2017.
European Search Report for European Application No. 18161997.4 dated May 17, 2018.
European Search Report for European Application No. 18160640.1 dated May 14, 2018.
(Continued)

*Primary Examiner* — Richard R. Green
*Assistant Examiner* — Arfan Y. Sinaki
(74) *Attorney, Agent, or Firm* — Jenkins, Wilson, Taylor & Hunt, P.A.

(57) ABSTRACT

A wing for an aircraft, including a main wing, a slat, and a connection assembly for movably connecting the slat to the main wing, such that the slat is movable between a retracted position and at least one extended position. The connection assembly includes a first connection element and a second connection element, both movably mounted to the main wing and mounted to the slat, wherein the second connection element is spaced apart from the first connection element in a wing span direction. The wing further includes a drive unit provided at the main wing and connected to the slat for initiating movement of the slat. An object, to prevent skew cases of the slat, is achieved in that the connection assembly includes a rotatable sync shaft rotatably engaging both the first connection element and the second connection element for sync movement of the first and second connection elements.

15 Claims, 7 Drawing Sheets

(58) Field of Classification Search
USPC .......................................................... 244/114
See application file for complete search history.

(56) References Cited

U.S. PATENT DOCUMENTS

| | | | | |
|---|---|---|---|---|
| 4,470,569 | A * | 9/1984 | Shaffer | ..................... B64C 9/22 |
| | | | | 244/213 |
| 4,650,140 | A | 3/1987 | Cole | |
| 4,838,503 | A | 6/1989 | Williams | |
| 7,048,234 | B2 | 5/2006 | Recksiek et al. | |
| 7,464,896 | B2 | 12/2008 | Carl et al. | |
| 8,127,912 | B2 * | 3/2012 | Lang | .................. F16H 25/2021 |
| | | | | 192/223.3 |
| 8,245,982 | B2 | 8/2012 | Vormezeele et al. | |
| 8,511,619 | B2 * | 8/2013 | Mann | ....................... B64C 9/22 |
| | | | | 244/214 |
| 2002/0005462 | A1 | 1/2002 | Broadbent | |
| 2005/0029407 | A1 | 2/2005 | Pohl et al. | |
| 2006/0038088 | A1 * | 2/2006 | Dodson | .................... B64C 9/22 |
| | | | | 244/214 |
| 2008/0229851 | A1 | 9/2008 | Jones | |
| 2010/0163685 | A1 | 7/2010 | Vormezeele et al. | |
| 2011/0120401 | A1 * | 5/2011 | Scherzinger | ............ F01L 1/047 |
| | | | | 123/90.17 |
| 2011/0168849 | A1 * | 7/2011 | Parker | ...................... B64C 9/02 |
| | | | | 244/214 |
| 2012/0325976 | A1 * | 12/2012 | Parker | ...................... B64C 9/22 |
| | | | | 244/203 |
| 2018/0273161 | A1 | 9/2018 | Schlipf et al. | |
| 2018/0274601 | A1 * | 9/2018 | Saito | ....................... F16D 23/12 |

FOREIGN PATENT DOCUMENTS

| | | | | |
|---|---|---|---|---|
| DE | 102014201239 | A1 | 7/2015 | |
| DE | 102015012237 | A1 | 3/2017 | |
| EP | 1985893 | A2 | 10/2008 | |
| EP | 2116467 | A1 | 11/2009 | |
| EP | 2202146 | A2 | 6/2010 | |
| EP | 2902314 | A1 | 8/2015 | |
| GB | 540041 | A * | 10/1941 | ............... B64C 9/22 |
| GB | 540041 | A | 10/1941 | |
| GB | 2138756 | A | 10/1984 | |
| WO | WO 2009/118547 | A1 | 10/2009 | |

OTHER PUBLICATIONS

Non-Final Office Action for U.S. Appl. No. 15/928,895 dated Jan. 17, 2020.
European Office Action for Application No. 18161997.4 dated May 14, 2020.
European Office Action for Application No. 18160640.1 dated May 15, 2020.
Non-Final Office Action for U.S. Appl. No. 15/928,895 dated Jun. 10, 2020.

* cited by examiner

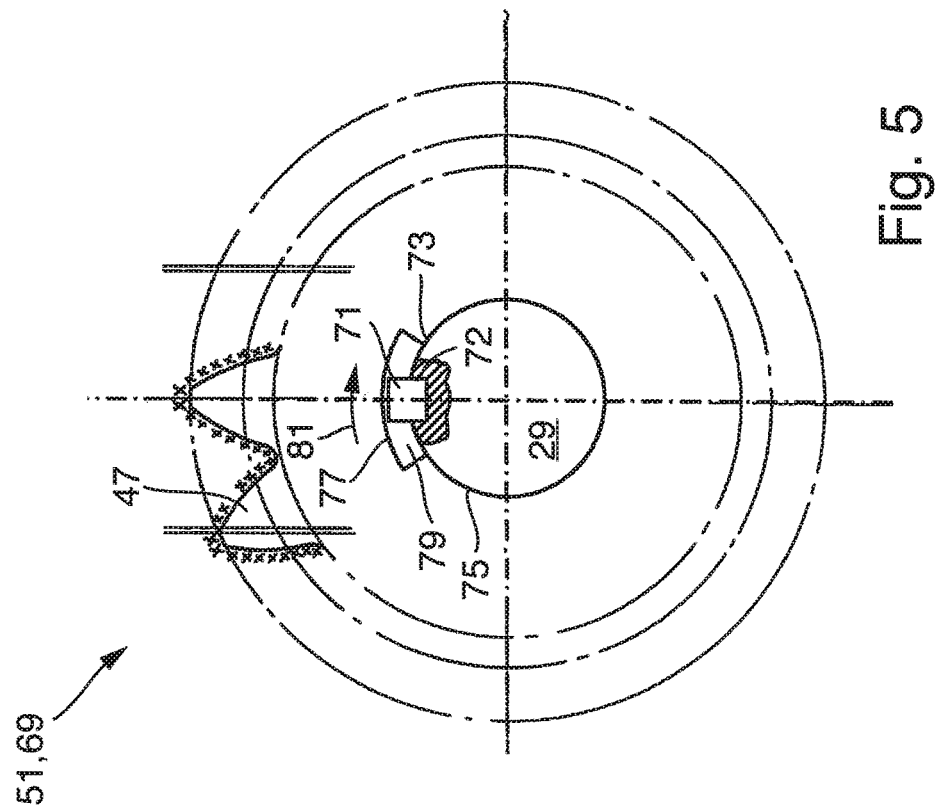
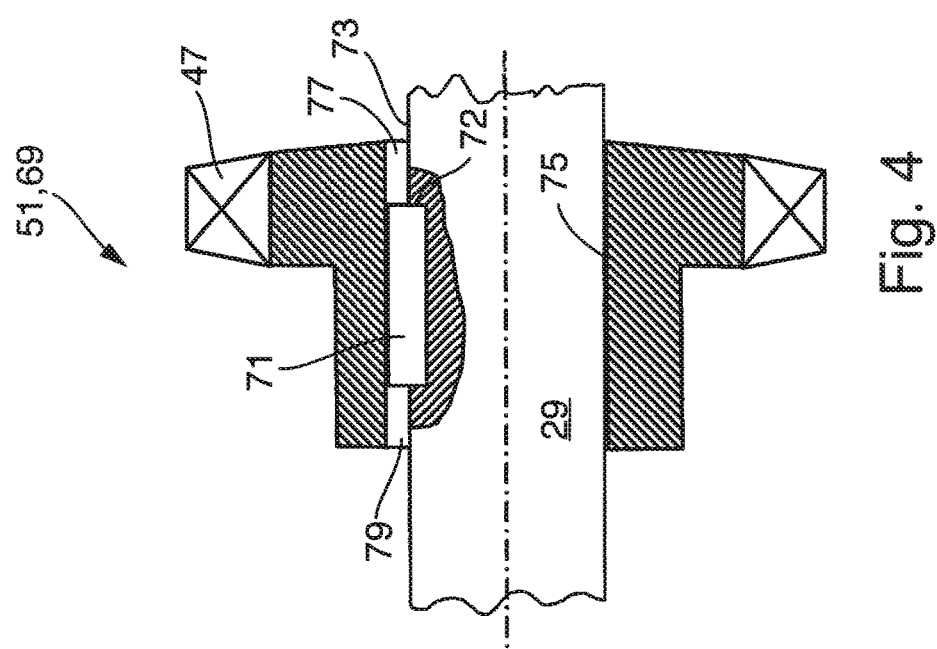

WING FOR AN AIRCRAFT

CROSS-REFERENCE TO RELATED APPLICATION

This application claims priority to German Patent Application No. 10 2017 106 443.5 filed Mar. 24, 2017, the entire disclosure of which is incorporated by reference herein.

TECHNICAL FIELD

The present disclosure relates to a wing for an aircraft. The wing comprises a main wing, a slat, and a connection assembly for movably connecting the slat to the main wing, such that the slat can be moved between a retracted position and at least one extended position.

BACKGROUND

The connection assembly comprises a first connection element, such as a slat track or link element, and a second connection element, such as a slat track or link element. The first connection element is movably mounted to the main wing and is mounted to the slat. The second connection element is movably mounted to the main wing and is mounted to the slat in a position spaced apart from the first connection element in a wing span direction. Further, the connection assembly comprises a drive unit that is provided at the main wing and that is connected to the slat for initiating movement of the slat between the retracted position and the extended position, wherein the connection of the drive unit to the slat might be directly or via the connection elements.

Such wings are known in the art. For the wings known in the art, skew cases are possible where the first and second connection elements do not move in sync and the slat might be skewed about a vertical axis.

SUMMARY

Therefore, an object of the present disclosure is to prevent such skew cases of the slat.

This object is achieved in that the connection assembly comprises a rotatable sync shaft supported at the main wing and rotatably engaging both the first connection element and the second connection element for sync movement of the first and second connection elements. In such a way, sync movement of the first connection element and the second connection element is guaranteed and skew of the slat is avoided.

According to a preferred embodiment, the first connection element comprises a first link element that is rotatably mounted to the main wing via a first joint, directly or via additional parts, and that is mounted to the slat, fixedly or rotatably via a joint. In particular, the sync shaft is rotatably engaged with the first link element at the first joint, e.g. by a geared connection, or is fixedly connected to the first link element at the first joint, i.e. at the axis of rotation of the first joint. Additionally or alternatively, it is preferred that the second connection element comprises a second link element that is rotatably mounted to the main wing via a second joint, directly or via additional parts, and that is mounted to the slat, fixedly or rotatably via a joint. In particular, the sync shaft is rotatably engaged with the second link element at the second joint, e.g. by a geared connection, or is fixedly connected to the second link element at the second joint, i.e. at the axis of rotation of the second joint. In such a way, a linkage connection assembly can be synchronized.

According to an alternative embodiment, the first connection element is formed as an elongate first slat track extending along a first longitudinal axis. The first slat track is mounted to the main wing movably along the first longitudinal axis and is fixedly mounted to the slat at a first track end. Additionally or alternatively, it is preferred that the second connection element is formed as an elongate second slat track extending along a second longitudinal axis. The second slat track is mounted to the main wing movably along the second longitudinal axis and is fixedly mounted to the slat at a second track end. Preferably, the first slat track and the second slat track are spaced apart from one another in a wing span direction with the first longitudinal axis in parallel to the second longitudinal axis. In particular, the sync shaft engages the first slat track by a first sync pinion mounted to the sync shaft and engaging a first rack mounted to the first slat track. Additionally or alternatively, the sync shaft engages the second slat track by a second sync pinion mounted to the sync shaft and engaging a second rack mounted to the second slat track. In such a way, a slat track connection assembly can be synchronized.

According to another preferred embodiment, the connection assembly comprises a third connection element that is movably mounted to the main wing and that is mounted to the slat.

Preferably, the drive unit is connected to the third connection element for driving the third connection element between the retracted position and the extended position of the slat. The drive unit might e.g. comprise a drive pinion rotatably engaging the third connection element, or might comprise a drive rod that is driven by e.g. a hydraulic cylinder or an electric motor and that is connected to the third connection element for driving the third connection element. In such a way, the slat can be driven by the third connection element.

In particular, it is preferred that the third connection element is formed as an elongate third slat track extending along a third longitudinal axis. The third slat track is mounted to the main wing movably along the third longitudinal axis and is fixedly mounted to the slat at a third track end.

Preferably, the drive unit comprises a drive pinion engaging the third slat track for driving the third slat track along the third longitudinal axis in order to move the slat between the retracted position and the extended position. It is also possible that the drive unit comprises a drive rod that is driven by e.g. a hydraulic cylinder or an electric motor and that is connected to the third slat track for driving the third slat track. By such a third slat track the slat can be guided and driven along a desired path.

According to a preferred embodiment, the third connection element is arranged between the first connection element and the second connection element. However, it is also possible that the second connection element is arranged between the first and third connection elements, or that the first connection element is arranged between the second and third connection elements. Preferably, the first connection element and the second connection element are mounted to opposite lateral sides of the slat in the wing span direction, wherein the third connection element is preferably mounted to the slat centrally between the first connection element and the second connection element. In such a way, a symmetric load distribution is achieved.

According to a further preferred embodiment, the sync shaft transfers rotational movement only between the first connection element and the second connection element. In particular, the sync shaft is not driven by or coupled to the third connection element or the drive unit. In such a way, the third connection element is coupled to the first and second connection elements only via the slat but not via the sync shaft. The first and second connection elements are, thus, passive and merely follow the driven third connection element. No constraint forces may arise between the first or second connection element on the one hand and the third connection element on the other hand.

Alternatively, it is preferred that the sync shaft engages the third connection element for sync movement of the third connection element with the first and second connection elements. The sync shaft might also be engaged to the drive unit directly. In such a way, sync movement of the first, second and third connection element is provided and, in case the sync shaft fails on the side of one of the first connection element and the second connection element, the third connection element may still move in sync with the other one of the first connection element and the second connection element.

In particular, it is preferred that the sync shaft engages the third connection element by a third sync pinion mounted to the sync shaft and engaging a third rack mounted to the third connection element. By such a rack and pinion connection, a reliable force transmission is achieved.

It is further preferred that the third sync pinion is mounted to the sync shaft via or in connection with a coupling mechanism. The coupling mechanism provides decoupling of the third sync pinion from the sync shaft during normal operation of the connection assembly, so that the sync shaft can rotate freely, at least for a certain angular range, without transferring torque between the third sync pinion and the sync shaft. The coupling mechanism further provides torque proof coupling of the third sync pinion to the sync shaft upon failure, such as fracture, of the connection assembly, in particular failure of the sync shaft, the first or second connection element, or the first or second sync pinion. By such a coupling mechanism, during normal operation the sync shaft is decoupled from the third connection element, so that no constraint forces occur. However, in case of failure of the sync shaft or of one of the first and second connection elements, the sync shaft can be coupled to the third connection element, so that the third connection element can still move in sync with the not failed other one of the first and second connection elements.

In particular, it is preferred that the coupling mechanism is formed as a coupling clutch. The coupling clutch comprises a first clutch part fixedly mounted to the sync shaft, and a second clutch part fixedly mounted to or integrally formed with the third sync pinion. The coupling clutch is configured such that upon a difference in rotational speed of the first clutch part and the second clutch part, the first clutch part and the second clutch part are moved relatively into torque proof engagement with one another. By such a coupling clutch, a reliable coupling mechanism is formed.

It is further preferred that the first clutch part is formed coaxially around the sync shaft and has a first friction surface extending in a radial plane and a second friction surface extending in a radial plane opposite the first friction surface, so that a gap is formed between the first and second friction surfaces. Preferably, the second clutch part is formed coaxially around the sync shaft and has a friction plate extending in a radial plane and extending in the gap between the first and second friction surfaces. Further preferably, the second clutch part is coupled to the sync shaft via a thread, so that upon a difference in rotational speed between the sync shaft and the third sync pinion, the second clutch part is moved axially along the sync shaft until the friction plate rests against the first friction surface or the second friction surface, so that a torque proof engagement is established by friction between the friction plate and the first or second friction surface. In such a way, a coupling clutch is formed that provides coupling for movement in two opposite directions upon friction.

According to an alternative embodiment, the coupling mechanism is formed as a feather key connection. Preferably, the sync shaft comprises a feather key received in a feather key groove and projecting radially up from a circumferential surface of the sync shaft. The third sync pinion at its inner surface resting against the sync shaft comprises a hub groove configured to receive the feather key. The hub groove is formed such that when the feather key is engaged with the hub groove the feather key has a certain play inside the hub groove in a tangential direction, so that within the region of this play the sync shaft might freely rotate without transferring torque to or from the third sync pinion, while torque is transferred between the sync shaft and the third sync pinion when the feather key is moved to the end of the play and rests against the tangential end of the hub groove. By such a feather key connection, a simple and reliable coupling mechanism is formed.

According to an alternative embodiment, the third sync pinion is mounted to the sync shaft via or in connection with a stopping mechanism that provides free rotation of the third sync pinion during normal operation of the connection assembly, and stopping of the third sync pinion upon failure, such as fracture, of the connection assembly, in particular failure of the sync shaft, the first or second connection element, or the first or second sync pinion. By such a stopping mechanism, during normal operation the sync shaft is decoupled from the third connection element, so that no constraint forces occur. However, in case of failure of the sync shaft or of one of the first and second connection elements, the sync shaft can be stopped, e.g. by coupling with the main wing, so that the entire connection assembly is held in a fixed and safe position.

In particular, it is preferred that the stopping mechanism is formed as a stopping clutch. The stopping clutch comprises a first clutch part fixedly mounted to the main wing, in particular to a wing rib of the main wing, and a second clutch part fixedly mounted to or integrally formed with the third sync pinion. The stopping clutch is configured such that upon a difference in rotational speed of the first clutch part and the second clutch part, the first clutch part and the second clutch part are moved relatively into torque proof engagement with one another. By such a stopping clutch, a reliable stopping mechanism is formed.

Preferably, the first clutch part is formed coaxially around the sync shaft and has a first friction surface extending in a radial plane, and a second friction surface extending in a radial plane opposite the first friction surface, so that a gap is formed between the first and second friction surfaces. Further preferably, the second clutch part is formed coaxially around the sync shaft and has a friction plate extending in a radial plane and extending within the gap between the first and second friction surfaces. Preferably, the second clutch part is coupled to the sync shaft via a thread, so that upon a difference in rotational speed between the sync shaft and the third sync pinion, the second clutch part is moved axially along the sync shaft until the friction plate rests against the first friction surface or the second friction surface, so that a torque proof engagement is established by friction between the friction plate and the first or second friction surface, and the third sync pinion is stopped against the wing rib of the main wing. In such a way, a stopping clutch is formed that provides stopping for movement in two opposite directions upon friction.

Preferably, the wing further comprises a torque sensor and a control unit. The torque sensor is configured to detect a torque applied by the drive pinion and to output a corresponding sensor signal to the control unit. The control unit is configured to output a warning signal in response to the sensor signal when a predetermined threshold torque is exceeded by the drive pinion, e.g. in case when the third sync pinion is stopped by the stopping mechanism. In such a way, the crew can be warned that the connection assembly has failed.

BRIEF DESCRIPTION OF THE DRAWINGS

Embodiments of the present disclosure are described hereinafter with reference to the various, example drawings. The drawings show in:

FIG. 4 a cross sectional view of a feather key connection that may be employed in the embodiment of FIG. 2;

FIG. 5 a different cross sectional view of the feather key connection of FIG. 4;

DETAILED DESCRIPTION

Figure 1:
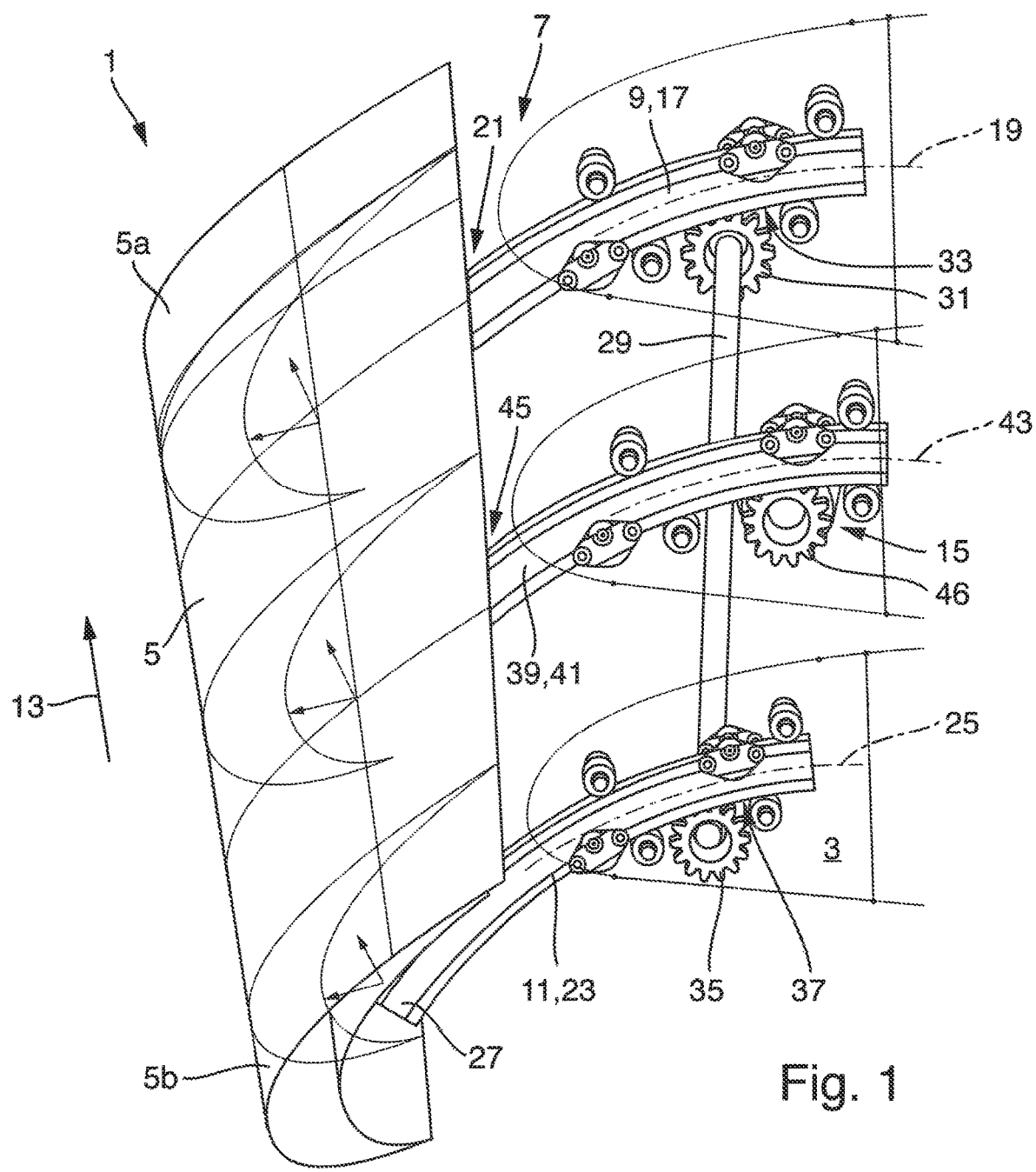
FIG. 1 a perspective view of a first embodiment of the wing according to the present disclosure, including three slat tracks.

In FIG. 1, a first embodiment of a wing 1 for an aircraft is shown. The wing 1 comprises a main wing 3, a slat 5, and a connection assembly 7 for movably connecting the slat 5 to the main wing 3, such that the slat 5 can be moved between a retracted position and at least one extended position.

The connection assembly 7 comprises a first connection element 9 and a second connection element 11. Both the first connection element 9 and the second connection element 11 are movably mounted to the main wing 3 and are mounted to the slat 5. The first and second connection elements 9, 11 are spaced apart from one another in a wing span direction 13. The connection assembly 7 further comprises a drive unit 15 that is provided at the main wing 3 and that is connected to the slat 5 for initiating movement of the slat 5 between the retracted position and the extended position.

The first connection element 9 is formed as a first slat track 17 extending along a first longitudinal axis 19, wherein the first slat track 17 is mounted to the main wing 3 movably along the first longitudinal axis 19, and is fixedly mounted to the slat 5 at a first track end 21. The second connection element 11 is formed as a second slat track 23 extending along a second longitudinal axis 25, wherein the second slat track 23 is mounted to the main wing 3 movably along the second longitudinal axis 25, and is fixedly mounted to the slat 5 at a second track end 27. The first slat track 17 and the second slat track 23 are spaced apart from one another in the wing span direction 13 with the first longitudinal axis 19 in parallel to the second longitudinal axis 25.

The connection assembly 7 comprises a rotatable sync shaft 29 supported at the main wing 3 and rotatably engaging both the first connection element 9, i.e. the first slat track 17, and the second connection element 11, i.e. the second slat track 23, for sync movement of the first and second connection elements 9, 11. The sync shaft 29 engages the first slat track 17 by a first sync pinion 31 that is mounted to the sync shaft 29 and that engages a first rack 33 mounted to the first slat track 17. The sync shaft 29 further engages the second slat track 23 by a second sync pinion 35 that is mounted to the sync shaft 29 and that engages a second rack 37 mounted to the second slat track 23.

The connection assembly 7 comprises a third connection element 39 that is movably mounted to the main wing 3 and that is mounted to the slat 5. The third connection element 39 is formed as a third slat track 41 extending along a third longitudinal axis 43. The third slat track 41 is mounted to the main wing 3 movably along the third longitudinal axis 43 and is fixedly mounted to the slat 5 at a third track end 45.

The drive unit 15 is connected to the third connection element 39, i.e. the third slat track 41, for driving the third connection element 39 between the retracted position and the extended position of the slat 5. The drive unit 15 comprises a drive pinion 46 engaging the third slat track 41 for driving the third slat track 41 along the third longitudinal axis 43.

The third connection element 39 is arranged between the first connection element 9 and the second connection element 11. The first connection element 9 and the second connection element 11 are mounted to opposite lateral sides 5a, 5b of the slat 5 in the wing span direction 13, wherein the third connection element 39 is mounted to the slat 5 centrally between the first connection element 9 and the second connection element 11.

In the embodiment of FIG. 1, the sync shaft 29 transfers rotational movement only between the first connection element 9 and the second connection element 11. The sync shaft 29 is not driven or coupled to the third connection element 39 or to the drive unit 15.

Figure 2:
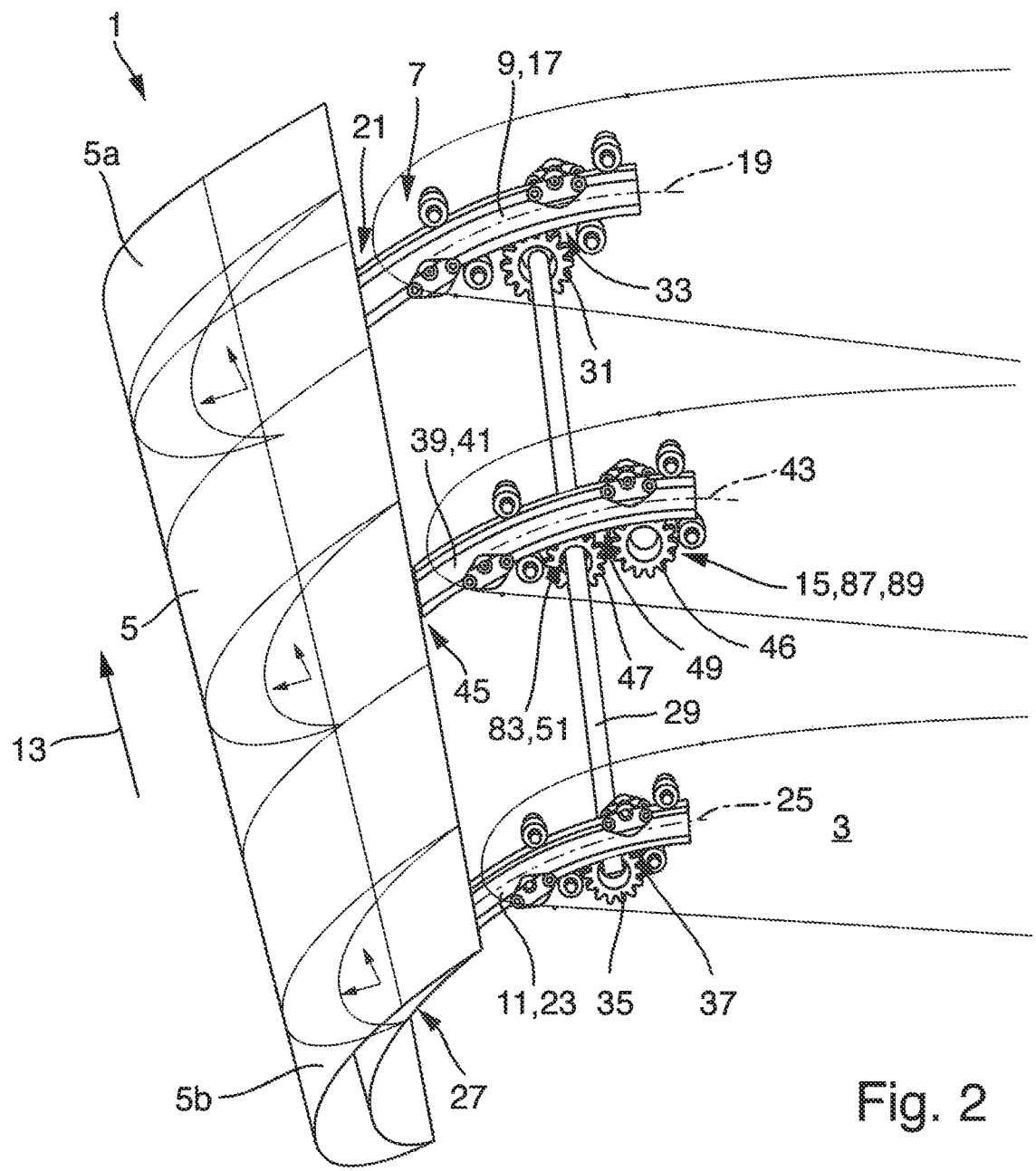
FIG. 2 a perspective view of a second embodiment of the wing according to the present disclosure, including three slat tracks and a coupling clutch.

In FIG. 2, a second embodiment of the wing 1 according to the disclosure herein is shown, where the sync shaft 29 engages the third connection element 39 for sync movement of the third connection element 39 with the first and second connection elements 9, 11. The sync shaft 29 engages the third connection element 39 by a third sync pinion 47 that is mounted to the sync shaft 29 and that engages a third rack 49 mounted to the third connection element 39.

Figure 3:
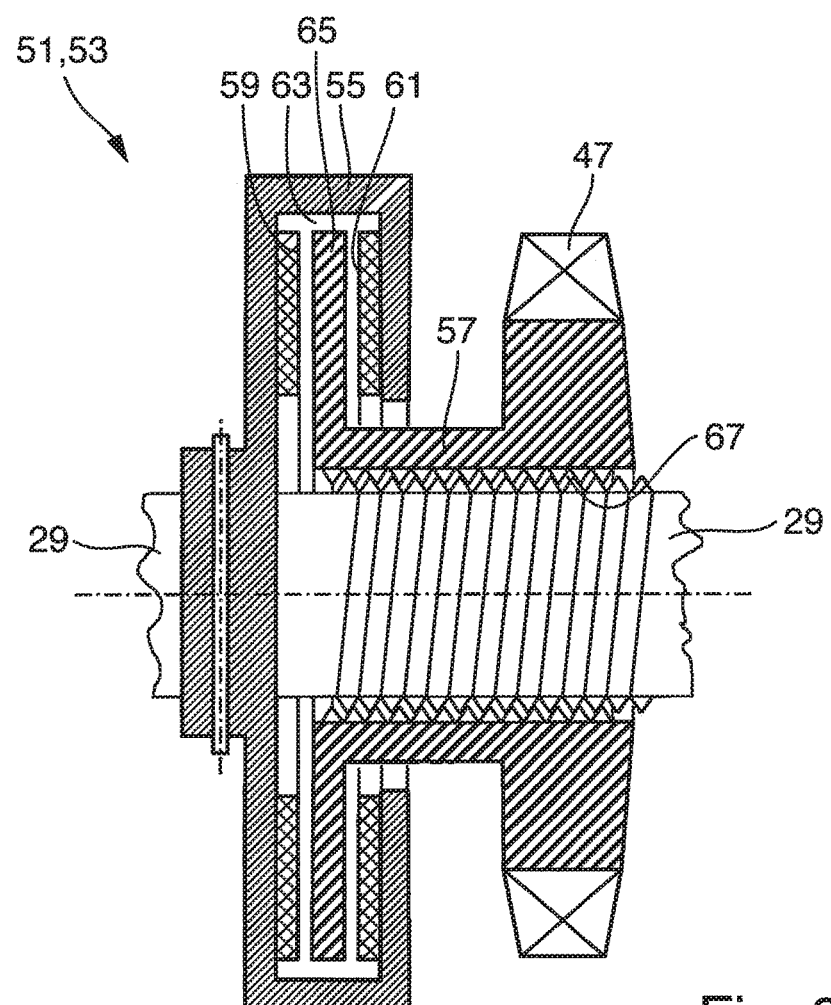
FIG. 3 a cross sectional view of a coupling clutch that may be employed in the embodiment of FIG. 2.

The third sync pinion 47 is mounted to the sync shaft 29 via a coupling mechanism 51 that provides decoupling of the third sync pinion 47 from the sync shaft 29 during normal operation of the connection assembly 7 and coupling of the third sync pinion 47 to the sync shaft 29 upon failure of the connection assembly 7. FIGS. 3 to 5 show two embodiments of such a coupling mechanism 51.

As shown in FIG. 3, the coupling mechanism 51 might be formed as a coupling clutch 53. The coupling clutch 53 comprises a first clutch part 55 fixedly mounted to the sync shaft 29, and a second clutch part 57 fixedly mounted to the third sync pinion 47. The coupling clutch 53 is configured such that upon a difference in rotational speed of the first clutch part 55 and the second clutch part 57, the first clutch part 55 and the second clutch part 57 are moved relatively into engagement with one another. The first clutch part 55 is formed coaxially around the sync shaft 29 and has a first friction surface 59 and a second friction surface 61 opposite the first friction surface 59, so that a gap 63 is formed between the first and second friction surfaces 59, 61. The second clutch part 57 is formed coaxially around the sync shaft 29 and has a friction plate 65 extending in the gap 63 between the first and second friction surfaces 59, 61. The second clutch part 57 is coupled to the sync shaft 29 via a thread 67, so that upon a difference in rotational speed between the sync shaft 29 and the third sync pinion 47, the second clutch part 57 is moved axially along the sync shaft 29 until the friction plate 65 rests against the first friction surface 59 or the second friction surface 61.

In FIGS. 4 and 5, an alternative coupling mechanism 51 is shown that is formed as a feather key connection 69. The sync shaft 29 comprises a feather key 71 received in a feather key groove 72 and projecting radially up from the circumferential surface 73 of the sync shaft 29. The third sync pinion 47 at its inner surface 75 resting against the circumferential surface 73 the sync shaft 29 comprises a hub groove 77 configured to receive the feather key 71. The hub groove 77 is formed such that when the feather key 71 is engaged with the hub groove 77 the feather key 71 has a certain play 79 inside the hub groove 77 in a tangential direction 81.

Figure 6:
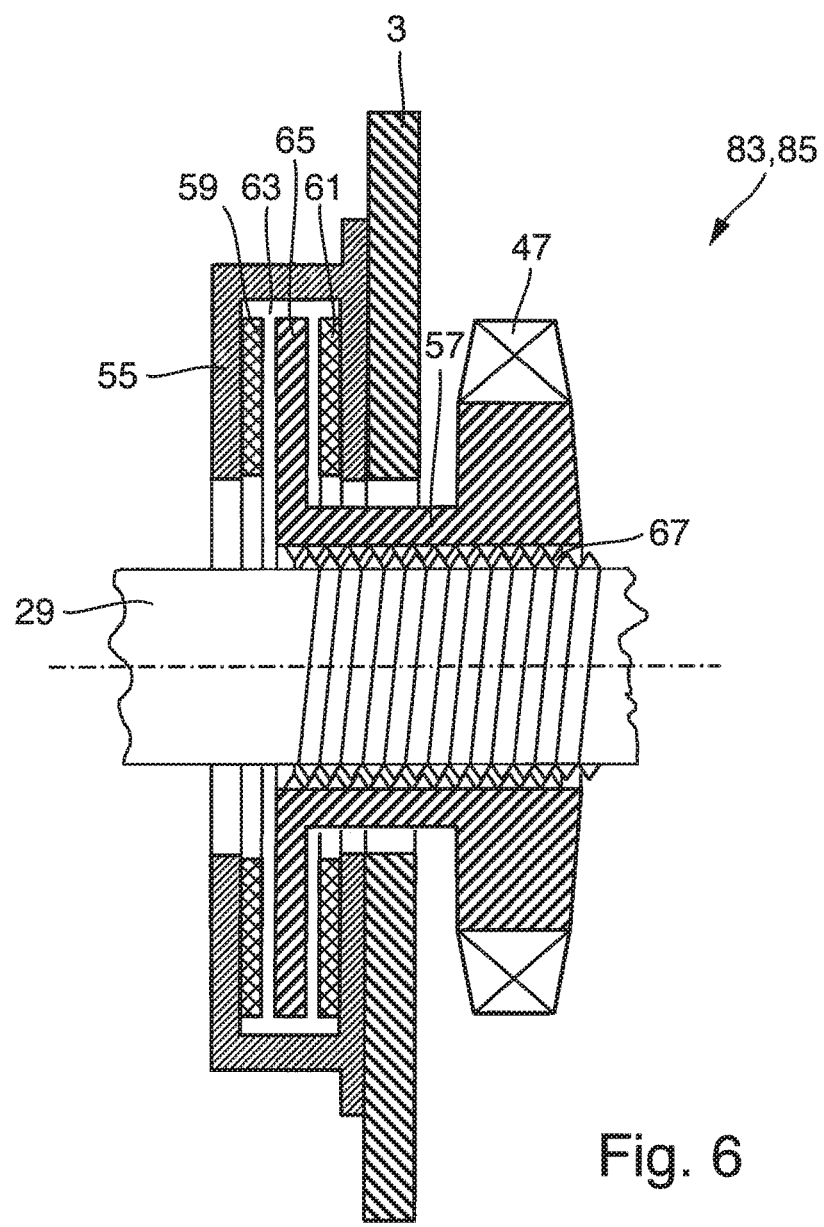
FIG. 6 a cross sectional view of a stopping clutch that may be employed in the embodiment of FIG. 2.

As shown in FIG. 6, the third sync pinion 47 might also be mounted to the sync shaft 29 via a stopping mechanism 83 that provides free rotation of the third sync pinion 47 during normal operation of the connection assembly 7, and that provides stopping of the third sync pinion 47 upon failure of the connection assembly 7. The stopping mechanism 83 is formed as a stopping clutch 85 that is formed similar to the coupling clutch 53 described herein, so that the same reference numerals are used for corresponding features. The stopping clutch 85 comprises a first clutch part 55 fixedly mounted to the main wing 3 and a second clutch part 57 fixedly mounted to the third sync pinion 47. The stopping clutch 85 is configured such that upon a difference in rotational speed of the first clutch part 55 and the second clutch part 57, the first clutch part 55 and the second clutch part 57 are moved relatively into engagement with one another. The first clutch part 55 is formed coaxially around the sync shaft 29 and has a first friction surface 59 and a second friction surface 61 opposite the first friction surface 59, so that a gap 63 is formed between the first and second friction surfaces 59, 61. The second clutch part 57 is formed coaxially around the sync shaft 29 and has a friction plate 65 extending within the gap 63 between the first and second friction surfaces 59, 61. The second clutch part 57 is coupled to the sync shaft 29 via a thread 67, so that upon a difference in rotational speed between the sync shaft 29 and the third sync pinion 47, the second clutch part 57 is moved axially along the sync shaft 29 until the friction plate 65 rests against the first friction surface 59 or the second friction surface 61. The wing 1 further comprises a torque sensor 87 and a control unit 89. The torque sensor 87 is configured to detect a torque applied by the drive pinion 46 and to output a corresponding sensor signal to the control unit 89. The control unit 89 is configured to output a warning signal in response to the sensor signal when a predetermined threshold torque is exceeded by the drive pinion 46.

Figure 7:
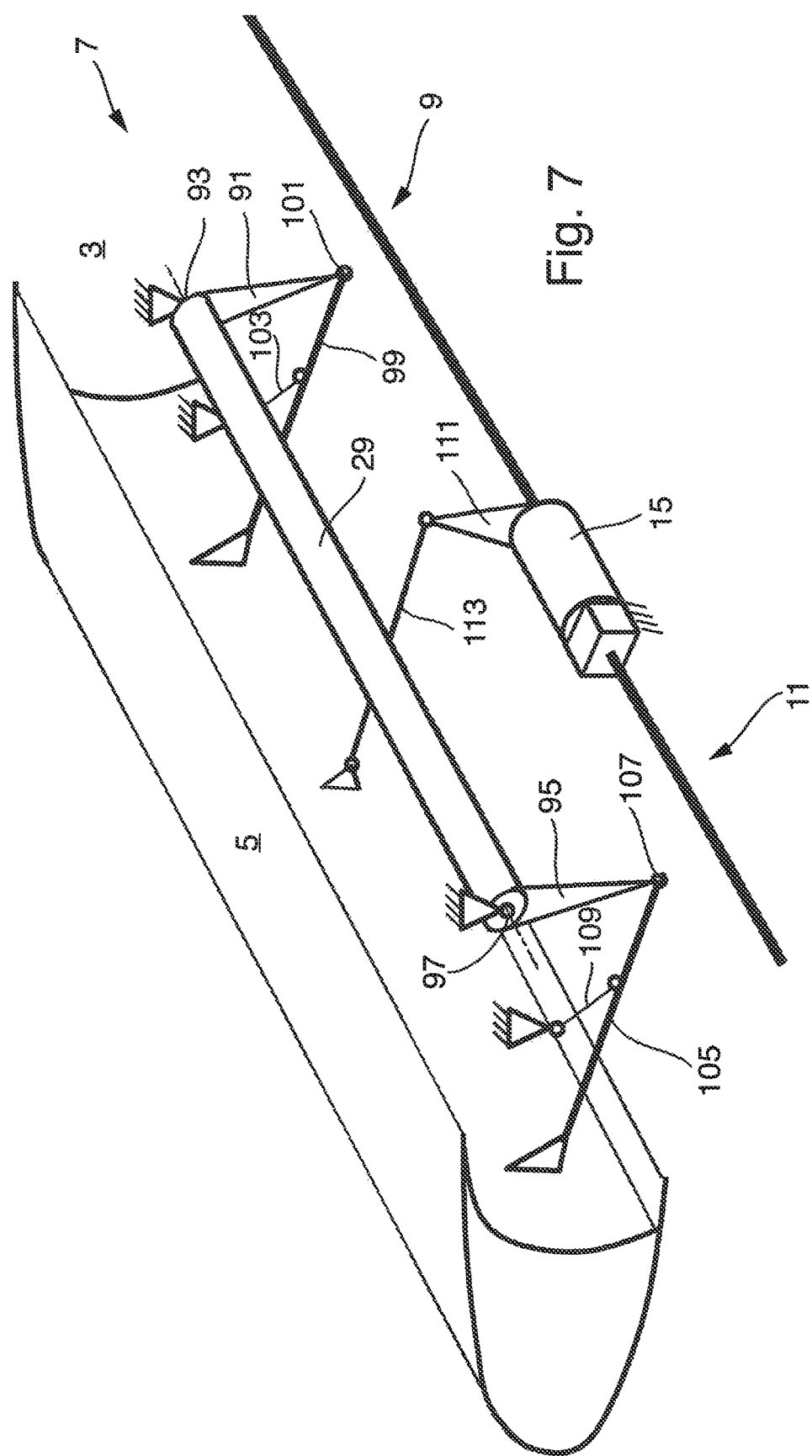
FIG. 7 a perspective view of a third embodiment of the wing according to the present disclosure, including link elements.

In FIG. 7, a third embodiment of the wing 1 is shown, where the first connection element 9 comprises a first link element 91 rotatably mounted to the main wing 3 via a first joint 93 and mounted to the slat 5 via a first rod 99 that is fixedly mounted to the slat 5 and rotatably mounted to the first link element 91 via a third joint 101. Further, the first connection element 9 comprises a third link element 103 that is rotatably mounted to the main wing 3 and rotatably mounted to the first rod 99, spaced apart from the first link element 91. The second connection element 11 comprises a second link element 95 rotatably mounted to the main wing 3 via a second joint 97 and mounted to the slat 5 via a second rod 105 that is fixedly mounted to the slat 5 and rotatably mounted to the second link element 95 via a fourth joint 107. Further, the second connection element 11 comprises a fourth link element 109 that is rotatably mounted to the main wing 3 and rotatably mounted to the second rod 105, spaced apart from the second link element 95. The sync shaft 29 is rotatably engaged with the first link element 91 at the first joint 93 and with the second link element 95 at the second joint 97, e.g. by a geared connection, or is fixedly connected to the first link element 91 at the first joint 93 and to the second link element 95 at the second joint 97, i.e. at the axis of rotation of the second joint 97. The drive unit 15 is arranged between the first and second connection assemblies 9, 11. The dive unit 15 comprises a rotating drive arm 111 that is rotatably coupled to a drive strut 113 that, in turn, is rotatably coupled to the slat 5.

Figure 8:
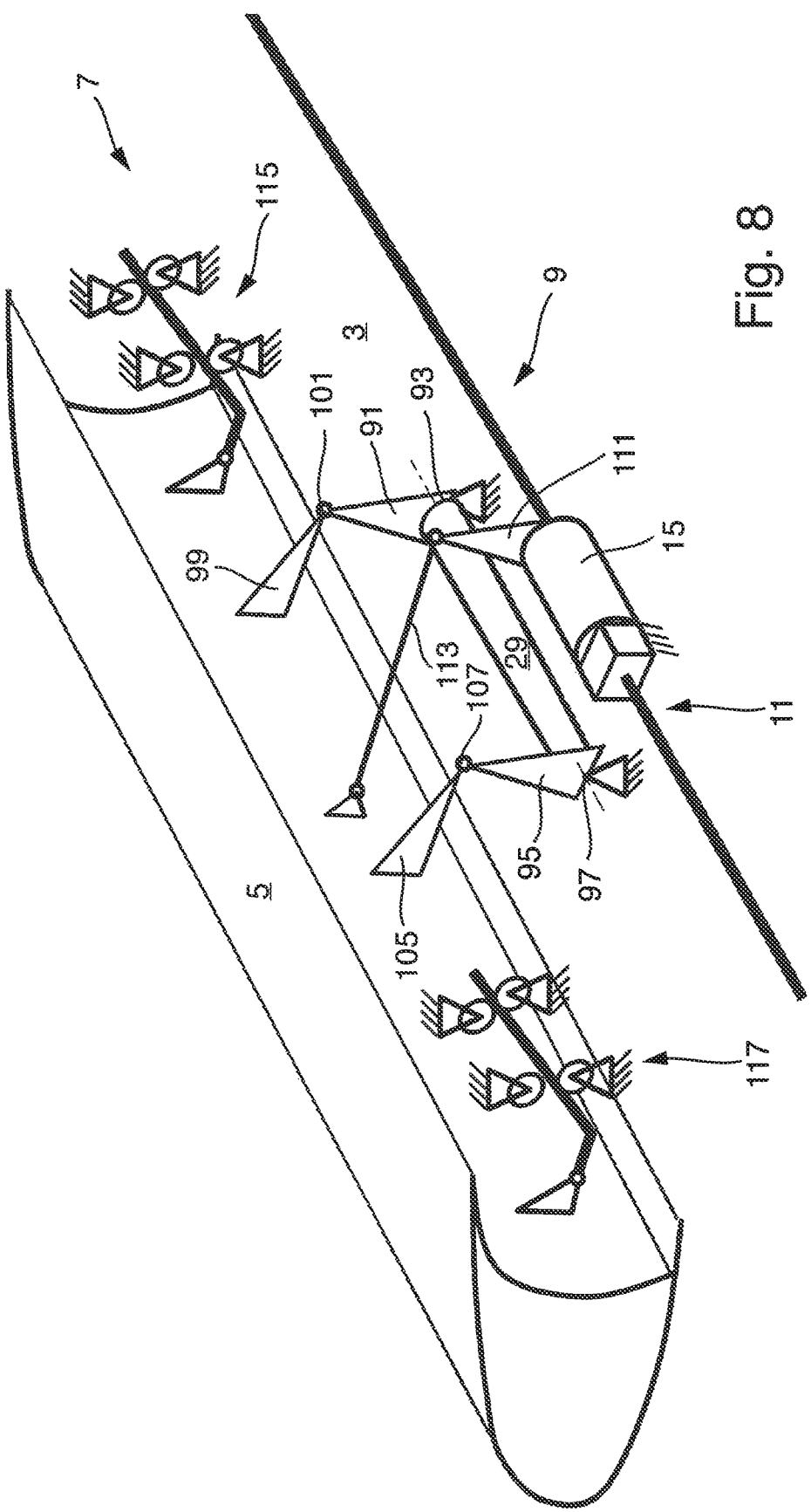
FIG. 8 a perspective view of a fourth embodiment of the wing according to the present disclosure, including link elements and additional tracks.

In FIG. 8, a fourth embodiment of the wing 1 is shown, where the first connection element 9 comprises a first link element 91 rotatably mounted to the main wing 3 via a first joint 93 and mounted to the slat 5 via a first rod 99 that is fixedly mounted to the slat 5 and rotatably mounted to the first link element 91 via a third joint 101. The second connection element 11 comprises a second link element 95 rotatably mounted to the main wing 3 via a second joint 97 and mounted to the slat 5 via a second rod 105 that is fixedly mounted to the slat 5 and rotatably mounted to the second link element 95 via a fourth joint 107. The sync shaft 29 is rotatably engaged with the first link element 91 at the first joint 93 and with the second link element 95 at the second joint 97, e.g. by a geared connection, or is fixedly connected to the first link element 91 at the first joint 93 and to the second link element 95 at the second joint 97, i.e. at the axis of rotation of the second joint 97. The drive unit 15 is arranged between the first and second connection assemblies 9, 11. The dive unit 15 comprises a rotating drive arm 111 that is rotatably coupled to a drive strut 113 that, in turn, is rotatably coupled to the slat 5. Additional to the first and second connection elements 9, 11, the connection assembly 7 comprises a third connection element 115 and a fourth connection element 117, both movably mounted to the main wing 3 and mounted to the slat 5, and both formed as slat tracks that, in the present embodiment, have a straight form along their longitudinal extension.

While at least one exemplary embodiment of the present invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
   a main wing;
   a slat; and
   a connection assembly for movably connecting the slat to the main wing, such that the slat is movable between a retracted position and at least one extended position;
   wherein the connection assembly comprises a first connection element and a second connection element,
   wherein the first connection element is movably mounted to the main wing and is mounted to the slat,
   wherein the second connection element is movably mounted to the main wing and is mounted to the slat in a position spaced apart from the first connection element in a wing span direction,
   wherein the connection assembly further comprises a drive unit at the main wing and connected to the slat for initiating movement of the slat between the retracted position and the extended position,
   wherein the connection assembly comprises a rotatable sync shaft distinct from the drive unit, the rotatable sync shaft rotatably engaging both the first connection element and the second connection element for sync movement of the first and second connection elements such that, during movement of the slat between the retracted position and the extended position initiated by the drive unit, the first and second connection elements move at a same speed.

2. The wing according to claim 1, wherein the first connection element comprises a first link element rotatably mounted to the main wing via a first joint and mounted to the slat, and wherein the second connection element comprises a second link element rotatably mounted to the main wing via a second joint.

3. The wing according to claim 1, wherein the first connection element is a first slat track extending along a first longitudinal axis, wherein the first slat track is mounted to the main wing movably along the first longitudinal axis, and is mounted to the slat,
   wherein the second connection element is a second slat track extending along a second longitudinal axis, wherein the second slat track is mounted to the main wing movably along the second longitudinal axis, and is mounted to the slat, and
   wherein the first slat track and the second slat track are spaced apart from one another in a wing span direction with the first longitudinal axis in parallel to the second longitudinal axis, and
   wherein the rotatable sync shaft engages the first slat track by a first sync pinion mounted to the rotatable sync shaft and engaging a first rack mounted to the first slat track, and wherein the rotatable sync shaft engages the second slat track by a second sync pinion mounted to the rotatable sync shaft and engaging a second rack mounted to the second slat track, and wherein the first sync pinion and the second sync pinion have a same radius.

4. The wing according to claim 1, wherein the connection assembly comprises a third connection element that is movably mounted to the main wing and that is mounted to the slat, wherein the drive unit is connected to the third connection element for driving the third connection element between the retracted position and the extended position of the slat.

5. The wing according to claim 4, wherein the third connection element is a third slat track extending along a third longitudinal axis, wherein the third slat track is mounted to the main wing movably along the third longitudinal axis, and is mounted to the slat, wherein the drive unit comprises a drive pinion engaging the third slat track for driving the third slat track along the third longitudinal axis.

6. The wing according to claim 4, wherein the third connection element is arranged between the first connection element and the second connection element, wherein the first connection element and the second connection element are mounted to opposite lateral sides of the slat, wherein the third connection element is mounted to the slat centrally between the first connection element and the second connection element.

7. The wing according to claim 4, wherein the rotatable sync shaft is configured to transfer rotational movement only between the first connection element and the second connection element.

8. The wing according to claim 4, wherein the rotatable sync shaft engages the third connection element for sync movement of the third connection element with the first and second connection elements.

9. The wing according to claim 8, wherein the rotatable sync shaft engages the third connection element by a third sync pinion mounted to the rotatable sync shaft and engaging a third rack mounted to the third connection element.

10. The wing according to claim 9, wherein the third sync pinion is mounted to the rotatable sync shaft via a coupling mechanism that provides:
    decoupling of the third sync pinion from the rotatable sync shaft during normal operation of the connection assembly; and
    coupling of the third sync pinion to the rotatable sync shaft upon failure of the connection assembly.

11. The wing according to claim 10, wherein the coupling mechanism is a coupling clutch,
    wherein the coupling clutch comprises a first clutch part fixedly mounted to the rotatable sync shaft, and a second clutch part fixedly mounted to the third sync pinion, and
    wherein the coupling clutch is configured such that upon a difference in rotational speed of the first clutch part and the second clutch part, the first clutch part and the second clutch part are moved relatively into engagement with one another.

12. The wing according to claim 11, wherein the first clutch part is formed coaxially around the rotatable sync shaft and has a first friction surface and a second friction surface opposite the first friction surface, so that a gap is formed between the first and second friction surfaces,
    wherein the second clutch part is formed coaxially around the rotatable sync shaft and has a friction plate extending in the gap between the first and second friction surfaces, and
    wherein the second clutch part is coupled to the rotatable sync shaft via a thread, so that upon a difference in rotational speed between the rotatable sync shaft and the third sync pinion, the second clutch part is moved axially along the rotatable sync shaft until the friction plate rests against the first friction surface or the second friction surface.

13. The wing according to claim 10, wherein the coupling mechanism is a feather key connection,
    wherein the rotatable sync shaft comprises a feather key received in a feather key groove and projecting radially up from a circumferential surface of the rotatable sync shaft, wherein the third sync pinion, at an inner surface resting against the rotatable sync shaft, comprises a hub groove configured to receive the feather key, and wherein the hub groove is formed such that when the feather key is engaged with the hub groove the feather key has a certain play inside the hub groove in a tangential direction.

14. The wing according to claim 9, wherein the third sync pinion is mounted to the rotatable sync shaft via a stopping mechanism that provides:

free rotation of the third sync pinion during normal operation of the connection assembly; and stopping of the third sync pinion upon failure of the connection assembly.

15. The wing according to claim 14, wherein the stopping mechanism is a stopping clutch, wherein the stopping clutch comprises a first clutch part fixedly mounted to the main wing, and a second clutch part fixedly mounted to the third sync pinion, wherein the stopping clutch is configured such that upon a difference in rotational speed of the first clutch part and the second clutch part, the first clutch part and the second clutch part are moved relatively into engagement with one another, wherein the first clutch part is formed coaxially around the rotatable sync shaft and has a first friction surface and a second friction surface opposite the first friction surface, so that a gap is formed between the first and second friction surfaces, wherein the second clutch part is formed coaxially around the rotatable sync shaft and has a friction plate extending within the gap between the first and second friction surfaces, wherein the second clutch part is coupled to the rotatable sync shaft via a thread, so that upon a difference in rotational speed between the rotatable sync shaft and the third sync pinion, the second clutch part is moved axially along the rotatable sync shaft until the friction plate rests against the first friction surface or the second friction surface, wherein the wing further comprises a torque sensor and a control unit, wherein the torque sensor is configured to detect a torque applied by a drive pinion and to output a corresponding sensor signal to the control unit, and wherein the control unit is configured to output a warning signal in response to the sensor signal when a predetermined threshold torque is exceeded by the drive pinion.

\* \* \* \* \*